(12) United States Patent
Kurabayashi et al.

(10) Patent No.: US 10,002,027 B2
(45) Date of Patent: Jun. 19, 2018

(54) NETWORK CONGESTION REDUCTION

(75) Inventors: Shuichi Kurabayashi, Fujiwasa (JP);
Naofumi Yoshida, Yokohama (JP);
Kosuke Takano, Fujisawa (JP)

(73) Assignee: EMPIRE TECHNOLOGY DEVELOPMENT LLC, Wilmington, DE (US)

( * ) Notice: Subject to any disclaimer, the term of this patent is extended or adjusted under 35 U.S.C. 154(b) by 126 days.

(21) Appl. No.: 13/697,294

(22) PCT Filed: Jul. 11, 2012

(86) PCT No.: PCT/US2012/046189
§ 371 (c)(1),
(2), (4) Date: Nov. 9, 2012

(87) PCT Pub. No.: WO2014/011163
PCT Pub. Date: Jan. 16, 2014

(65) Prior Publication Data
US 2014/0019638 A1    Jan. 16, 2014

(51) Int. Cl.
*G06F 15/16* (2006.01)
*G06F 9/50* (2006.01)
*H04L 12/24* (2006.01)
*H04L 12/801* (2013.01)

(52) U.S. Cl.
CPC ......... *G06F 9/5072* (2013.01); *H04L 41/145* (2013.01); *H04L 47/127* (2013.01)

(58) Field of Classification Search
CPC .......... H04L 65/80; G06F 11/30; G06F 15/16; G06F 2201/86; G06F 2201/88; G06F 2221/2149; G06F 3/044; G06F 8/61; G06F 8/63

USPC ........................................ 709/215, 226, 235
See application file for complete search history.

(56) References Cited

U.S. PATENT DOCUMENTS

| | | | |
|---|---|---|---|
| 7,239,611 B2 | 7/2007 | Khisti et al. | |
| 9,444,858 B1 * | 9/2016 | Boyle | H04L 65/4023 |
| 2004/0261116 A1 * | 12/2004 | Mckeown | H04L 12/24 |
| | | | 725/109 |
| 2008/0134138 A1 * | 6/2008 | Chamieh | G06F 9/4428 |
| | | | 717/105 |
| 2008/0198752 A1 * | 8/2008 | Fan et al. | 370/238 |
| 2008/0271025 A1 * | 10/2008 | Gross et al. | 718/102 |
| 2011/0145920 A1 * | 6/2011 | Mahaffey | G06F 21/564 |
| | | | 726/22 |
| 2011/0225600 A1 * | 9/2011 | Araki | G06F 9/54 |
| | | | 719/328 |
| 2011/0231568 A1 | 9/2011 | Bansal et al. | |
| 2011/0289198 A1 * | 11/2011 | Isaacson | G06F 11/3058 |
| | | | 709/221 |

(Continued)

FOREIGN PATENT DOCUMENTS

| | | |
|---|---|---|
| CN | 102307221 A | 1/2012 |
| CN | 102497426 A | 6/2012 |

OTHER PUBLICATIONS

Shetty's priority claim to U.S. Appl. No. 61/567,737, filed Dec. 7, 2011.*

(Continued)

*Primary Examiner* — Bryan Lee
*Assistant Examiner* — Oluwatosin Gidado

(57) ABSTRACT

Technologies and implementations for reducing congestion in a network are generally disclosed.

23 Claims, 4 Drawing Sheets

(56) References Cited

U.S. PATENT DOCUMENTS

| | | | |
|---|---|---|---|
| 2011/0310899 | A1 | 12/2011 | Alkhatib et al. |
| 2011/0320546 | A1* | 12/2011 | Holden ................ G06F 9/5083 709/206 |
| 2012/0173731 | A1 | 7/2012 | Lin et al. |
| 2012/0317558 | A1* | 12/2012 | Agarwal ............... G06F 9/4552 717/149 |
| 2013/0254761 | A1* | 9/2013 | Reddy ................ G06F 9/45558 718/1 |
| 2013/0281102 | A1* | 10/2013 | Webb ............................ 455/450 |
| 2014/0101768 | A1* | 4/2014 | Miller ..................... G06F 21/51 726/25 |
| 2014/0149794 | A1* | 5/2014 | Shetty ................ H04L 67/1095 714/20 |

OTHER PUBLICATIONS

Amazon AWS Team, Summary of the amazon EC2 and amazon RDS service disruption in the US east region, Apr. 29, 2011, accessed online on Oct. 2, 2012 via http://aws.amazon.com/message/65648/.

Google App Engine Team, Post-mortem for Feb. 24th, 2010 outage, accessed online via http://groups.google.com/forum on Oct. 2, 2012.

Brumley, D., Analysis and defense of vulnerabilities in binary code, Thesis, Sep. 29, 2008, pp. 1-155, School of Computer Science, Carnegie Mellon University, Pittsburgh, PA, USA.

Cytron, R., et al, Efficiently computing static single assignment form and the control dependence graph, ACM Transactions on Programming Languages and Systems, vol. 13, No. 4, Oct. 1991, pp. 451-490.

Gal, A., et al, Java bytecode verification via static single assignment form, ACM Transactions on Programming Languages and Systems, Jul. 2008, pp. 1-21, vol. 30, No. 4, Article 21.

United States Patent and Trademark Office, International search report and written opinion of the international searching authority for PCT/US2012/46189, dated Sep. 26, 2012, USA.

Pandey, S., Scheduling and management of data intensive application workflows in grid and cloud computing environments, Dec. 2010, Accessed online on Sep. 3, 2012 via www.cloudbus.org/students/SurajPhDThesis2010.pdf.

Pandey, S. "Scheduling and management of data intensive application workflows in grid and cloud computing environments", Engineering Computer Science and Software Engineering, Dec. 2010, 203 pages.

\* cited by examiner

400 A computer program product

402 A signal bearing medium

404 Machine-readable instructions that, when executed by one or more processors, operatively enable a network congestion module to:

receive an upload of an application software in a cloud computing environment;

determine one or more synchronization events associated with the application software; and determine a probability of congestion based, at least in part, on the determined one or more synchronization events.

| 406 a computer-readable medium | 408 a recordable medium | 410 a communications medium |

Fig. 4

NETWORK CONGESTION REDUCTION

CROSS-REFERENCE TO RELATED APPLICATION

This application is a U.S. National Stage filing under 35 U.S.C. § 371 of International Application No. PCT/US12/46189, filed on Jul. 11, 2012. The disclosure of the International Application is hereby incorporated by reference in its entirety.

BACKGROUND

Unless otherwise indicated herein, the approaches described in this section are not prior art to the claims in this application and are not admitted to be prior art by inclusion in this section.

As computer networks increase in size, the number of applications that may perform I/O operations on the network may also increase. For example, cloud computing environments (e.g., shared datacenters, shared computing environments, or the like) may allow a number of applications to perform I/O operations on the networks making up the cloud computing environments. Often, these applications may be allowed to perform I/O operations on the network simultaneously. As can be appreciated, a large number of applications performing I/O operations on a network simultaneously may cause network congestion, which may lead to a larger-scale system failure.

Applications performing I/O operations on cloud computing environments may do so within the environment, as a result, network congestion may not be prevented by external controls (e.g., load balancers, firewalls, or the like).

SUMMARY

Described herein are various illustrative methods for reducing network congestion. Example methods may include receiving an upload of an application software in the cloud computing environment, determining one or more synchronization events associated with the application software, and determining a probability of congestion based, at least in part, on the determined one or more synchronization events.

The present disclosure also describes various example machine readable non-transitory medium having stored therein instructions that, when executed, cause a device to reduce congestion in a network. Example machine readable non-transitory media may have stored therein instructions that, when executed by one or more processors, operatively enable a network congestion module to receive an upload of an application software in a cloud computing environment, determine one or more synchronization events associated with the application software, and determine a probability of congestion based, at least in part, on the determined one or more synchronization events.

The present disclosure additionally describes example systems. Example systems may include a processor, a network congestion module communicatively coupled to the processor, and a machine-readable medium communicatively coupled to the processor and the network congestion module, the machine-readable medium having stored therein instruction that, when executed by the processor, cause the network congestion module to receive an upload of an application software in a cloud computing environment, determine one or more synchronization events associated with the application software, and determine a probability of congestion based, at least in part, on the determined one or more synchronization events.

The foregoing summary is illustrative only and not intended to be in any way limiting. In addition to the illustrative aspects, embodiments, and features described above, further aspects, embodiments, and features will become apparent by reference to the drawings and the following detailed description.

BRIEF DESCRIPTION OF THE DRAWINGS

Subject matter is particularly pointed out and distinctly claimed in the concluding portion of the specification. The foregoing and other features of the present disclosure will become more fully apparent from the following description and appended claims, taken in conjunction with the accompanying drawings. Understanding that these drawings depict only several embodiments in accordance with the disclosure, and are therefore, not to be considered limiting of its scope. The disclosure will be described with additional specificity and detail through use of the accompanying drawings.

In the drawings:

FIG. 4 is an illustration of an example computer program product; and

DETAILED DESCRIPTION

Figure 1:
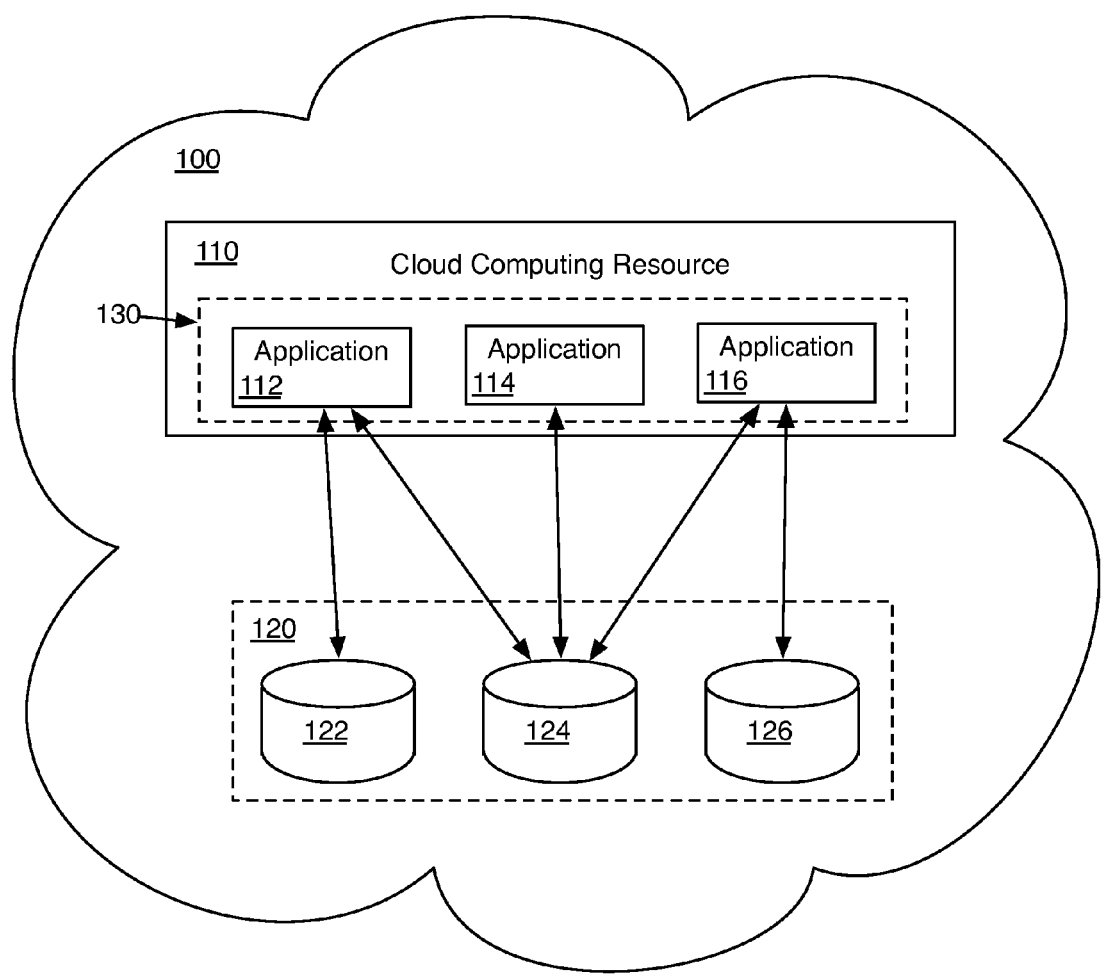
FIG. 1 is an illustration of a block diagram of an example cloud computing environment.

The following description sets forth various examples along with specific details to provide a thorough understanding of claimed subject matter. It will be understood by those skilled in the art that claimed subject matter might be practiced without some or more of the specific details disclosed herein. Further, in some circumstances, well-known methods, procedures, systems, components and/or circuits have not been described in detail, in order to avoid unnecessarily obscuring claimed subject matter.

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented here. It will be readily understood that the aspects of the present disclosure, as generally described herein, and illustrated in the Figures, can be arranged, substituted, combined, and designed in a wide variety of different configurations, all of which are explicitly contemplated and make part of this disclosure.

This disclosure is drawn, inter alia, to methods, devices, systems and computer readable media related to reducing network congestion.

As indicated above, when multiple applications perform I/O operations (e.g., reading, writing, transmitting, querying, or the like) within a cloud computing environment simultaneously, they may cause network congestion within the cloud computing environment. This network congestion could lead to system failure, which may cause downtime or service interruptions within the cloud computing environment. As will be appreciated, a single event (e.g., a reboot, a network disconnect/reconnect, a power interruption, or the like) may trigger I/O operations from multiple applications running on the cloud computing environment. Accordingly, the occurrence of a single event may cause a large number of I/O operations to be initiated simultaneously (e.g., by multiple applications responding to the event, or the like). Execution of these many I/O operations in synchronization (e.g., at the same time, within a sufficiently short time, or the like) may cause congestion within the network.

For example, a cloud computing environment may be comprised of computing components (e.g., computer servers, virtual machines, nodes within a distributed computing environment, or the like) and storage components (e.g., computer servers, shared data pools, network attached storage devices, or the like). Applications executing on the computing components may use the storage components for I/O operations (e.g., reading data, writing data, or the like). Certain events (e.g., a computing component rebooting, a network setting error, or the like) may cause a large number of applications executing on the computing components to simultaneously initiate I/O operations with the storage components.

These simultaneous I/O operations may cause network congestion (e.g., overwhelm the storage components, or the like), which may cause the storage components to become temporarily unavailable. This may result in further failures (e.g., service interruptions, or the like) of the cloud computing environment. For example, a large number of applications seeking to write data to a storage component may temporarily prevent any application from performing I/O operations with the storage component.

Since the I/O operations originate from within the cloud computing environment, external controls (e.g., firewalls, load balancers, or the like) may not affectively prevent network congestion resulting from simultaneous I/O operations. Furthermore, as the cloud computing environment is designed to facilitate third party (e.g., a customer, or the like) use, preventing third party applications from performing I/O operations may also not be a suitable solution to preventing network congestion.

In order to provide a short introduction to the disclosed subject matter, the following non-limiting examples are given. In general, various embodiments of the present disclosure may provide an application authentication process for use in a cloud computing environment. For example, prior to being allowed to execute in a cloud computing environment, an application may be checked for instructions that involve I/O operations being performed in conjunction with specific events. The likelihood that the applications may contribute to network congestion may then be determined.

The example cloud computing environment may further include installation controls that may prevent or allow installation of certain application based upon the determined likelihood that the application may cause network congestion. Additionally, the example cloud computing environment may include an event propagation system. The event propagation system may control the notification of events such that the actual likelihood of network congestion is reduced. Although various embodiments of the disclosed subject matter reference reducing network congestion while describing the example implementations, this is not a requirement of the various embodiments. It will be appreciated that reducing network congestion is a desirable result, as opposed to a requirement of the various examples.

FIG. 1 illustrates an example cloud computing environment 100, arranged in accordance with at least some embodiments described herein. The cloud computing environment 100 may be implemented to reduce the likelihood of network congestion resulting from simultaneous I/O requests. In general, the cloud computing environment 100 may be used to determine the likelihood that an application (e.g., a software program, a virtual machine, a device driver, or the like) will contribute to network congestion. For example, the I/O operations that may be initiated in response to particular events (e.g., actions occurring outside the applications, or the like) as well as the probability that the I/O operations will contribute to network congestion may be determined. The cloud computing environment 100 may further be used to control installation of application(s) based on the determined likelihood of contributing to network congestion. Further still, the cloud computing environment 100 may be used to control how applications are notified of the occurrence of particular events, with the intent, for example, to reduce the likelihood of network congestion.

As can be seen from this figure, the cloud computing environment 100 includes a cloud computing resource 110. In general, the cloud computing resource 110 may be any type of shared computing system (e.g., a computer server, a virtualized computer, a computer cluster, or the like) upon which a user may install and run applications. For example, the cloud computing resource 110 may be a computer platform upon which user-specific applications may be deployed and run. This type of computing platform may often be referred to as "platform as a service" (PaaS). As another example, the cloud computing resource 110 may be a virtualized computing platform upon which a user may install and run applications. This type of computing platform may often be referred to as "infrastructure as a service" (IaaS). Examples of PaaS and IaaS systems may be SALESFORCE.COM, GOOGLE App Engine, APPSCALE, WINDOWS AZURE, and AMAZON Elastic Compute Cloud. In some embodiments of the disclosed subject matter, the cloud computing resource may be implemented in conjunction with a "software as a service" (SaaS) platform.

FIG. 1 shows the cloud computing resource having applications 112, 114 and 116 installed therein. As will be appreciated, a typical cloud computing environment 100 may have many different cloud computing resources 110, each with many applications installed therein. However, FIG. 1 shows only the cloud computing resource 110 and applications 112, 114 and 116 for clarity of presentation. It is to be appreciated that various embodiments described herein may be scaled to accommodate a number of cloud computing resources and applications.

As indicated above, applications 112, 114 and/or 116 may perform I/O operations. In general, the I/O operations may be any type of communication (e.g., data transfer, signal transfer, or the like) between an application (e.g., the application 112, the application 114, the application 116, or the like) and another component (e.g., another application, a computing device, a storage component, a transmitter, a receiver, a display device, an input device, or the like). In some embodiments, the applications 112, 114 and/or 116 may read and/or write data to a storage location. Accordingly, FIG. 1 shows a cloud storage array 120 having cloud storage elements 122, 124 and 126. In general, the cloud storage elements 122, 124 and 126 may be any type of data storage components (e.g., hard disk drives, flash memory drives, storage arrays, databases, another cloud storage environment, or the like).

The I/O operations (e.g., reading and/or writing data from and/or to the cloud storage array 120, or the like) may be triggered by a particular event. For example, when the cloud computing resource reboots, the applications 112, 114 and 116 may attempt to read data from the cloud storage array 120. As can be appreciated, each individual I/O operation may be small in terms of the overall computational overhead (network bandwidth, computational cycles, data read/write time, or the like) required to perform the operation. However, when multiple (e.g., thousands, millions, hundreds of millions, or the like) I/O operations are simultaneously initiated (referred to herein as a "massively synchronized action"), the sum of the computational overhead required to perform each individual I/O operation of the massively synchronized action may increase dramatically.

As used herein, I/O operations may be considered "simultaneously" initiated if they are initiated at the same time, at substantially the same time, or within a specified amount of time from each other. For example, if a group of I/O operations are all initiated within a specified interval (e.g., 1 millisecond, 1 second, 5 seconds, or the like), they may be considered simultaneously initiated. In some embodiments, the interval may depend upon the system (e.g., cloud computing system, or the like) in which the I/O operations are initiated. For example, some systems may be able to handle a larger number of simultaneous I/O requests that other systems. Accordingly, the time interval for such system may be shorter.

In many cases, the computing resources available in the cloud computing environment 100 may be insufficient to handle what is required to perform the massively synchronized action. As a result, network congestion (e.g., overloaded bus, reduction in available storage space, reduction in available computational cycles, reduction in available read access, or the like) within the cloud computing environment 100 may increase to the point that a failure (e.g., a service interruption, downtime, lagging response, or the like) may occur.

Figure 2:
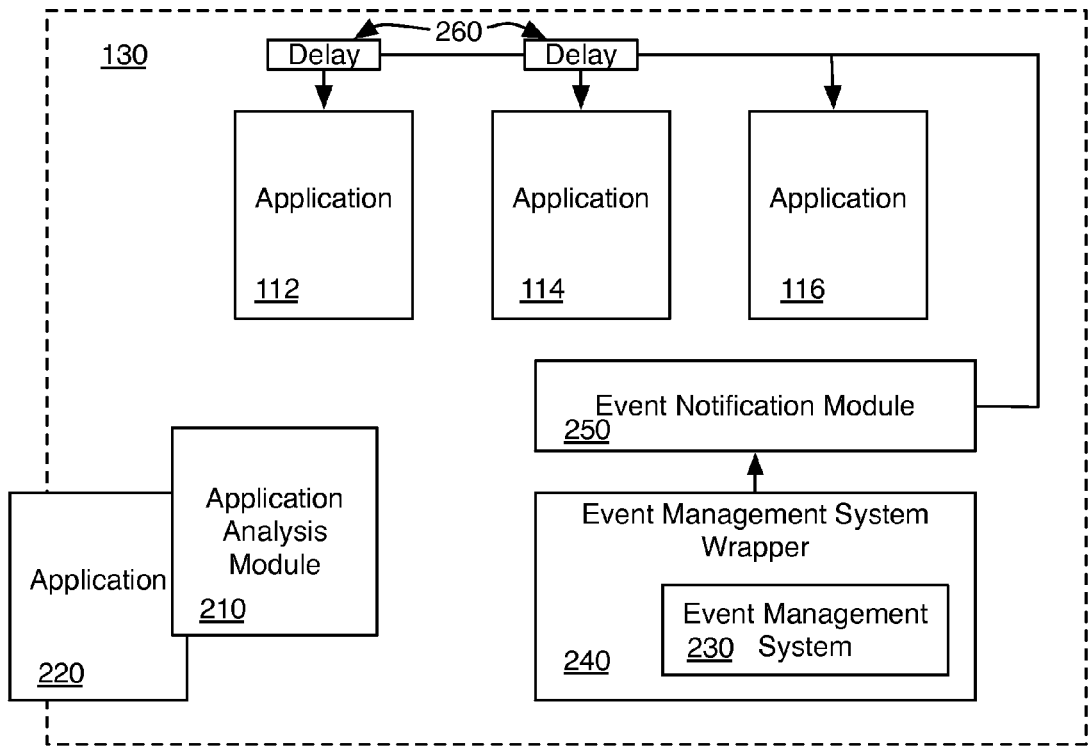
FIG. 2 is an illustration of a block diagram of an example network congestion module.

In order to reduce the likelihood of network congestion, a network congestion module 130 may be implemented in the cloud computing environment 100. FIG. 2 is an illustration of a block diagram of the example network congestion module 130, in accordance with at least some embodiments described herein. As can be seen from this figure, the applications 112, 114 and 116 are also shown. In general, the network congestion module 130 may be implemented to identify events that may cause applications (e.g., the applications 112, 114 and/or 116, or the like) to initiate I/O operations. The network congestion module 130 may also be configured to determine the likelihood that an application might contribute to network congestion, for example, by basing the determination in part on the determined events. Furthermore, the network congestion module 130 may be implemented to prevent or allow installation of certain application based upon the determined likelihood that the application may contribute to network congestion. Additionally, the network congestion module 130 may be implemented to control how applications are notified of events.

As can be seen from FIG. 2, the network congestion module 130 may include an application analysis module 210. In general, the application analysis module 210 may identify events that might trigger I/O operations by an application. In some implementations, the network congestion module 130 may be configured such that the application analysis module 210 analyzes applications prior to installation within a cloud computing environment (e.g., the cloud computing environment 100, or the like). For example, FIG. 2 shows an application 220 overlapping the application analysis module 210. With some embodiments, the application analysis module 210 may identify instructions (e.g., native code instructions, API calls, or the like) within an application (e.g., the application 220, or the like) that trigger I/O operations in synchronization with particular events.

In general, an event may be any action external to an application (e.g., the application 220, or the like). For example, actions related to the operation of the cloud computing environment 100 (e.g., rebooting, disk quota saturation, network disconnection, network reconnection, UPS activation, UPS deactivation, or the like) may trigger an application to initiate I/O operations. These types of events may be referred to as "system" events. Other types of actions, referred to as "time" events may also trigger an application to initiate I/O operations. For example, various applications having similar functionality (e.g., advertisement functionality, calendar functionality, or the like) may simultaneously initiate I/O operations at specific times (e.g., peak online shopping times such as during holidays, popular news events such as presidential elections, popular product release dates, or the like).

As will be appreciated, both system events and time events may be likely to simultaneously invoke the functions of many applications, which may result in massively synchronized actions. For example, a large number of I/O operations within the cloud computing environment 100 may be simultaneously initiated by the applications 112, 114 and/or 116 in response to the occurrence of a single event.

As will be appreciated, computing systems (e.g., the cloud computing resource 110, or the like) may include logic and/or features (e.g., system calls, TCP/IP servers, APIs, or the like) configured to watch for the occurrence of selected events. As can be seen from FIG. 2, the network congestion module 130 may include an event management system 230. In general, the event management system 230 may be configured to watch for the occurrence of particular events and then alert the cloud computing environment 100 of the events occurrence. As will be appreciated, the event management system 230 may post the event to an event queue, which may then be checked (e.g., using interrupts, or the like) by applications executing on the cloud computing environment 100.

As stated above, the application analysis module 210 determines events that may cause a particular application to initiate I/O operations. More particularly, the application analysis module 210 may detect portions of an application (e.g., portions of source code for the application, portions of binary code for the application, or the like) that may be executed in synchronization with the occurrence of an event.

In general, when applications are deployed (e.g., installed, or the like) on a cloud system (e.g., the cloud computing environment 100), the applications may be installed collectively. More specifically, the application software, including libraries on which application software depends may be installed. As such, it may be possible to check applications (e.g., the application 220) to determine events that may trigger I/O operations.

For example, the application analysis module 210 may analyze the binary, that is, native code supported by the cloud computing resource 110 (e.g., native code supported by an Intel x86 processor, native code supported by an AMDx64 processor, or the like) to look for instructions that may initiate I/O operations in response to the occurrence of an event. In some embodiments, binary code may be analyzed by looking for interrupts that access the event management system 230 (e.g., a system call, a Win32 API call, or the like). For example, codes involving the issuance of the "int 0x80" interrupt in the case of an Intel CPU, may indicate an API call to the event management system 230. In further embodiments, a control flow graph (e.g., a graph representing the structure of conditional branches and loops in the application) may be extracted from the binary code. Subsequently, the conditions that invoke an I/O operation (e.g., the event) may be determined from the control flow graph.

As an alternate example, the application analysis module 210 may analyze byte code (e.g., a Java VM program, a .Net CRM program, or the like). As will be appreciated, byte code is an executable program composed of a set of instructions that are defined so as not to depend on a specific OS or hardware. In some embodiments, byte code may be analyzed by looking at class libraries provided by the programming language (e.g., Java, C#, or the like) corresponding to the application. In general, the class libraries may be standardized (e.g., processing related to dates in Java maybe concentrated in java.util.Date). Accordingly, it may be possible to detect codes that might cause an application to initiate I/O operations in response to an event by detecting a reference to specific class module(s).

As another alternate example, the application analysis module 210 may analyze source code (e.g., Python code, Perl code, Ruby code, or the like). As will be appreciated, source code may generally be written in human intelligible text strings. Accordingly, access to the event management system 230 may be detected by looking for (e.g., text string search, or the like) a name representing the event management system 230 within the source code.

As stated, the application analysis module 210 may determine events within an application that cause I/O operations to be initiated. Additionally, the application analysis module 210 may determine the likelihood (e.g., probability, or the like) that the initiated I/O operations will contribute to network congestion. In some embodiments, a probability of network congestion may be determined from the following formula:

Network Congestion=probability of event occurrence*(number of applications deployed on cloud nodes/probability of network sharing by cloud nodes)*(volume of I/O access on event occurrence/network bandwidth).

For example, in the case where applications that respond to a network disconnection event are deployed on 10,000 nodes in a cloud system having an internal bandwidth of 1 GBps, in which the probability of occurrence of the network disconnection event is 0.1%, one network is shared by 100 nodes, and the application performs data access of about 100 Mbytes upon the occurrence of the event, the network congestion probability may be calculated as 0.1×((10000/100)×100M/1 G)=10. As will be appreciated, a probability of 10 may indicate that network congestion associated with massively synchronized actions will occur with a high probability.

With some embodiments of the disclosed subject matter, the application analysis module 210 may be configured to prevent applications (e.g., the application 220) from being installed in the cloud computing environment if the determined probability is above a threshold value. As will be appreciated, the threshold value will be implementation specific and may, for example, depend upon the size, the requirements (e.g., guaranteed uptime, security, or the like) of the cloud computing environment 100.

As indicated above, with some embodiments, the network congestion module 130 may be configured to control how applications (e.g., the applications 112, 114 and/or 116) are notified of the occurrence of particular events. Accordingly, the network congestion module may be shown including an event management system wrapper 240 and an event notification module 250. In general, the event management system wrapper 240 may prevent direct access to the event management system 230 by the applications. Furthermore, the event management system wrapper 240 may provide events to event notification module 250, which may then notify the applications on a delayed schedule.

For example, the event notification module 250 may notify individual applications (e.g. the application 112, or the like) of the occurrence of an event on a regular schedule. More specifically, the event notification module 250 may notify the applications based on a delay 260. With various implementations, the event notification module 250 may scale based on the number of applications waiting on particular events. For example, in a cloud computing environment where 10,000 applications respond to a single event, the event notification module 250 may notify 100 applications of the event at regular intervals (e.g., 10 seconds, or the like) As such, the time lag between when the event actually occurs and when applications are notified may be such that massively synchronized actions are avoided. As a result, network congestion may be reduced.

Figure 3:
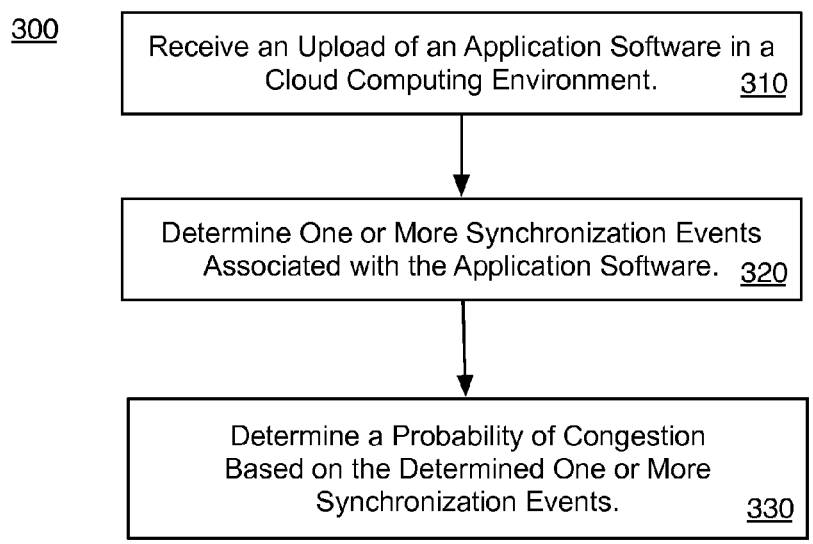
FIG. 3 is a flow diagram of an example method for reducing congestion in a network.

FIG. 3 illustrates a flow chart of an example method for reducing congestion in a network, arranged in accordance with at least some embodiments described herein. In some portions of the description, illustrative implementations of the method are described with reference to elements of the cloud computing environment 100 and the network congestion module 130 depicted in FIGS. 1 and 2. However, the described embodiments are not limited to these depictions. More specifically, some elements depicted in FIGS. 1 and 2 may be omitted from some implementations of the methods detailed herein. Furthermore, other elements not depicted in FIGS. 1 and 2 may be used to implement example methods detailed herein.

Additionally, FIG. 3 employs block diagrams to illustrate the example methods detailed therein. These block diagrams may set out various functional blocks or actions that may be described as processing steps, functional operations, events and/or acts, etc., and may be performed by hardware, software, and/or firmware. Numerous alternatives to the functional blocks detailed may be practiced in various implementations. For example, intervening actions not shown in the figures and/or additional actions not shown in the figures may be employed and/or some of the actions shown in the figures may be eliminated. In some examples, the actions shown in one figure may be operated using techniques discussed with respect to another figure. Additionally, in some examples, the actions shown in these figures may be operated using parallel processing techniques. The above described, and other not described, rearrangements, substitutions, changes, modifications, etc., may be made without departing from the scope of claimed subject matter.

FIG. 3 illustrates an example method 300 for reducing congestion in a network. Beginning at block 310 ("Receive an Upload of an Application Software in a Cloud Computing Environment"), the network congestion module 130 may include logic and/or features configured to receive an upload of application software in a cloud computing environment. In general, at block 310, the application analysis module 210 may receive the application 220.

Continuing from block 310 to block 320 ("Determine One or More Synchronization Events Associated with the Application Software"), the network congestion module 130 may include logic and/or features configured to determine event(s) that may trigger the received application to initiate I/O operations. In general, at block 320, the application analysis module 210 may determine one or more events that cause the application 220 to initiate I/O operations.

Continuing from block 320 to block 330 ("Determine a Probability of Congestion Based on the Determined One or More Synchronization Events."), the network congestion module 130 may include logic and/or features to determine a probability of network congestion based on the occurrence of the determined event(s). In general, at block 330, the application analysis module 210 may determine a probably of network congestion resulting from occurrence of the determined event(s). For example, in some embodiments, the application analysis module 210 may derive a probability of network congestion using, for example, the above detailed formula at block 330.

In general, the method described with respect to FIG. 3 and elsewhere herein may be implemented as a computer program product, executable on any suitable computing system, or the like. For example, a computer program product for reducing congestion in a network may be provided. Example computer program products are described with respect to FIG. 4 and elsewhere herein.

FIG. 4 illustrates an example computer program product 400, arranged in accordance with at least some embodiments described herein. Computer program product 400 may include machine readable non-transitory medium having stored therein instructions that, when executed, cause the machine to reduce congestion in a network according to the processes and methods discussed herein. Computer program product 400 may include a signal bearing medium 402. Signal bearing medium 402 may include one or more machine-readable instructions 404, which, when executed by one or more processors, may operatively enable a computing device to provide the functionality described herein. In various examples, some or all of the machine-readable instructions may be used by the devices discussed herein.

In some examples, the machine readable instructions 404 may include receiving an upload of an application software in a cloud computing environment. In some examples, the machine readable instructions 404 may include determining one or more synchronization events associated with the application software. In some examples, the machine readable instructions 404 may include determining a probability of congestion based on the determined one or more synchronization events. In some examples, the machine readable instructions 404 may include determining if the probability of congestion is more than a predetermined number. In some examples, the machine readable instructions 404 may include preventing implementation of the application software in the cloud computing environment, if it is determined that the probability of congestion is more than the predetermined number. In some examples, the machine readable instructions 404 may include determining if the probability of congestion is less than a predetermined number. In some examples, the machine readable instructions 404 may include facilitating implementation of the application software in the cloud computing environment, if it is determined that the probability of congestion if less than the predetermined number. In some examples, the machine readable instructions 404 may include receiving the upload of the application software in at least one of a infrastructure as a service (IaaS), platform as a service (PaaS), and/or software as a service (SaaS) based cloud computing environment. In some examples, the machine readable instructions 404 may include detecting instructions for at least one of synchronized network communications or input/output (I/O) operations associated with the application software. In some examples, the machine readable instructions 404 may include controlling propagation of notification of the one or more synchronization events in the cloud computing environment based, at least in part, on the determined probability of congestion. In some examples, the machine readable instructions 404 may include determining one or more shared system events at a plurality of nodes in the cloud computing environment. In some examples, the machine readable instructions 404 may include determining one or more shared time events capable of affecting a plurality of nodes in the cloud computing environments. In some examples, the machine readable instructions 404 may include determining a relationship based, at least in part, on an event occurrence probability, a number of event sharing nodes in the cloud computing environment, a probability of network sharing by the number of event sharing nodes, a volume of input/output (I/O) access due to the event occurrence, and a bandwidth of the network. In some examples, the machine readable instructions 404 may include utilizing application programming interface (API) based instructions.

In some implementations, signal bearing medium 402 may encompass a computer-readable medium 406, such as, but not limited to, a hard disk drive, a Compact Disc (CD), a Digital Versatile Disk (DVD), a digital tape, memory, etc. In some implementations, the signal bearing medium 402 may encompass a recordable medium 408, such as, but not limited to, memory, read/write (R/W) CDs, R/W DVDs, etc. In some implementations, the signal bearing medium 402 may encompass a communications medium 410, such as, but not limited to, a digital and/or an analog communication medium (e.g., a fiber optic cable, a waveguide, a wired communication link, a wireless communication link, etc.). In some examples, the signal bearing medium 402 may encompass a machine readable non-transitory medium.

In general, the methods described with respect to FIG. 3 and elsewhere herein may be implemented in any suitable server and/or computing system. Example systems may be described with respect to FIG. 5 and elsewhere herein. In some examples, a resource, data center, data cluster, cloud computing environment, or other system as discussed herein may be implemented over multiple physical sites or locations. In general, the system may be configured to reduce congestion in a network.

Figure 5:
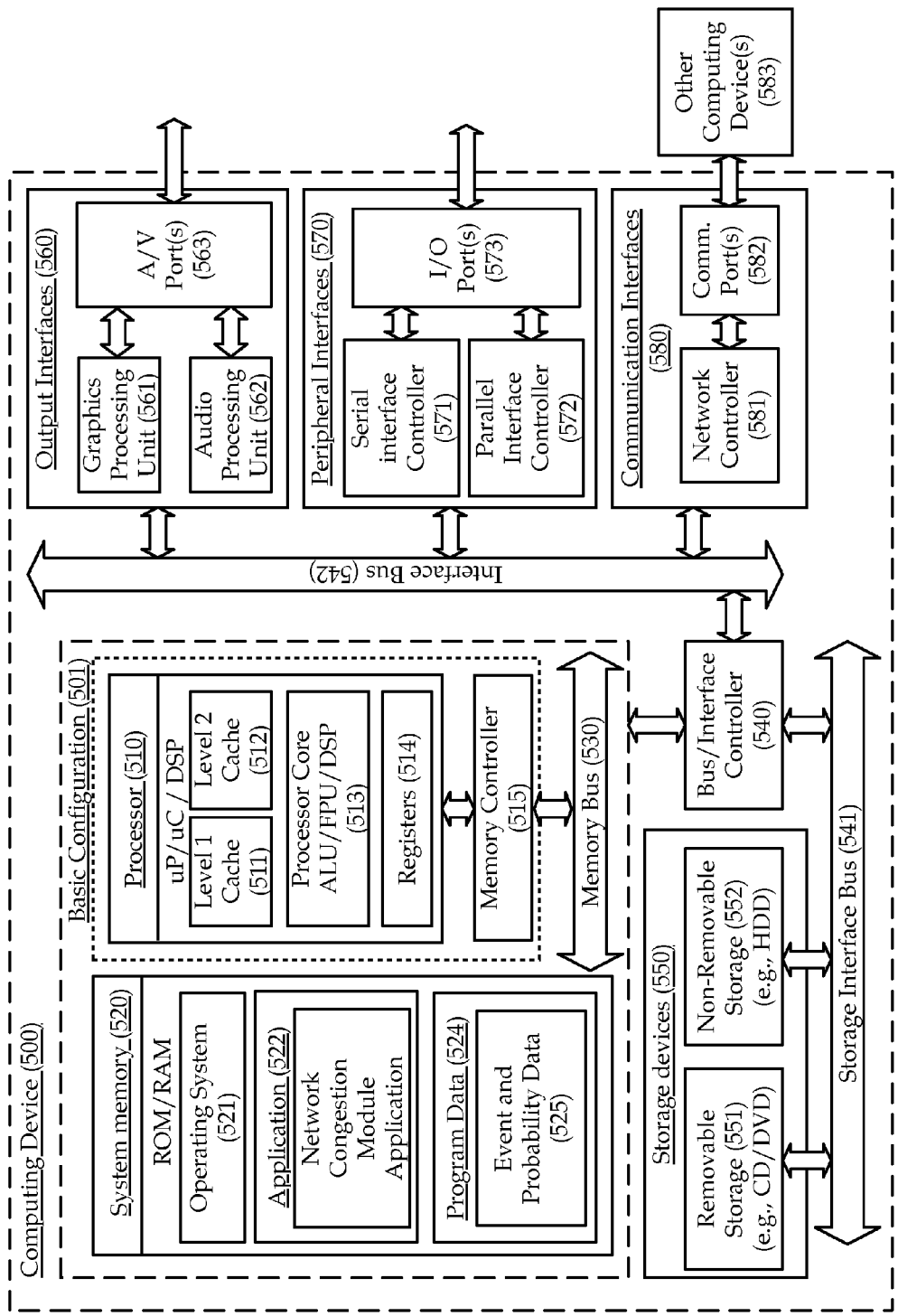
FIG. 5 is an illustration of a block diagram of an example computing device, all arranged in accordance with at least some embodiments described herein.

FIG. 5 is a block diagram illustrating an example computing device 500, arranged in accordance with at least some embodiments described herein. In various examples, computing device 500 may be configured to reduce congestion in a network as discussed herein. In various examples, computing device 500 may be configured to reduce congestion in a network as a server system or as a tool as discussed herein. In one example of a basic configuration 501, computing device 500 may include one or more processors 510 and a system memory 520. A memory bus 530 can be used for communicating between the one or more processors 510 and the system memory 520.

Depending on the desired configuration, the one or more processors 510 may be of any type including but not limited to a microprocessor (µP), a microcontroller (µC), a digital signal processor (DSP), or any combination thereof. The one or more processors 510 may include one or more levels of caching, such as a level one cache 511 and a level two cache 512, a processor core 513, and registers 514. The processor core 513 can include an arithmetic logic unit (ALU), a floating point unit (FPU), a digital signal processing core (DSP Core), or any combination thereof. A memory controller 515 can also be used with the one or more processors 510, or in some implementations the memory controller 515 can be an internal part of the processor 510.

Depending on the desired configuration, the system memory 520 may be of any type including but not limited to volatile memory (such as RAM), non-volatile memory (such as ROM, flash memory, etc.) or any combination thereof. The system memory 520 may include an operating system 521, one or more applications 522, and program data 524. The one or more applications 522 may include network congestion module application 523 that can be arranged to perform the functions, actions, and/or operations as described herein including the functional blocks, actions, and/or operations described herein. The program data 524 may include event and probability data 525 for use with the network congestion module application 523. In some example embodiments, the one or more applications 522 may be arranged to operate with the program data 524 on the operating system 521. This described basic configuration 501 is illustrated in FIG. 5 by those components within dashed line.

Computing device 500 may have additional features or functionality, and additional interfaces to facilitate communications between the basic configuration 501 and any required devices and interfaces. For example, a bus/interface controller 540 may be used to facilitate communications between the basic configuration 501 and one or more data storage devices 550 via a storage interface bus 541. The one or more data storage devices 550 may be removable storage devices 551, non-removable storage devices 552, or a combination thereof. Examples of removable storage and non-removable storage devices include magnetic disk devices such as flexible disk drives and hard-disk drives (HDD), optical disk drives such as compact disk (CD) drives or digital versatile disk (DVD) drives, solid state drives (SSD), and tape drives to name a few. Example computer storage media may include volatile and nonvolatile, removable and non-removable media implemented in any method or technology for storage of information, such as computer readable instructions, data structures, program modules, or other data.

The system memory 520, the removable storage 551 and the non-removable storage 552 are all examples of computer storage media. The computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which may be used to store the desired information and which may be accessed by the computing device 500. Any such computer storage media may be part of the computing device 500.

The computing device 500 may also include an interface bus 542 for facilitating communication from various interface devices (e.g., output interfaces, peripheral interfaces, and communication interfaces) to the basic configuration 501 via the bus/interface controller 540. Example output interfaces 560 may include a graphics processing unit 561 and an audio processing unit 562, which may be configured to communicate to various external devices such as a display or speakers via one or more NV ports 563. Example peripheral interfaces 570 may include a serial interface controller 571 or a parallel interface controller 572, which may be configured to communicate with external devices such as input devices (e.g., keyboard, mouse, pen, voice input device, touch input device, etc.) or other peripheral devices (e.g., printer, scanner, etc.) via one or more I/O ports 573. An example communication interface 580 includes a network controller 581, which may be arranged to facilitate communications with one or more other computing devices 583 over a network communication via one or more communication ports 582. A communication connection is one example of a communication media. The communication media may typically be embodied by computer readable instructions, data structures, program modules, or other data in a modulated data signal, such as a carrier wave or other transport mechanism, and may include any information delivery media. A "modulated data signal" may be a signal that has one or more of its characteristics set or changed in such a manner as to encode information in the signal. By way of example, and not limitation, communication media may include wired media such as a wired network or direct-wired connection, and wireless media such as acoustic, radio frequency (RF), infrared (IR) and other wireless media. The term computer readable media as used herein may include both storage media and communication media.

The computing device 500 may be implemented as a portion of a small-form factor portable (or mobile) electronic device such as a cell phone, a mobile phone, a tablet device, a laptop computer, a personal data assistant (PDA), a personal media player device, a wireless web-watch device, a personal headset device, an application specific device, or a hybrid device that includes any of the above functions. The computing device 500 may also be implemented as a personal computer including both laptop computer and non-laptop computer configurations. In addition, the computing device 500 may be implemented as part of a wireless base station or other wireless system or device.

Some portions of the foregoing detailed description are presented in terms of algorithms or symbolic representations of operations on data bits or binary digital signals stored within a computing system memory, such as a computer memory. These algorithmic descriptions or representations are examples of techniques used by those of ordinary skill in the data processing arts to convey the substance of their work to others skilled in the art. An algorithm is here, and generally, is considered to be a self-consistent sequence of operations or similar processing leading to a desired result. In this context, operations or processing involve physical manipulation of physical quantities. Typically, although not necessarily, such quantities may take the form of electrical or magnetic signals capable of being stored, transferred, combined, compared or otherwise manipulated. It has proven convenient at times, principally for reasons of common usage, to refer to such signals as bits, data, values, elements, symbols, characters, terms, numbers, numerals or the like. It should be understood, however, that all of these and similar terms are to be associated with appropriate physical quantities and are merely convenient labels. Unless specifically stated otherwise, as apparent from the following discussion, it is appreciated that throughout this specification discussions utilizing terms such as "processing," "computing," "calculating," "determining" or the like refer to actions or processes of a computing device, that manipulates or transforms data represented as physical electronic or magnetic quantities within memories, registers, or other information storage devices, transmission devices, or display devices of the computing device.

The claimed subject matter is not limited in scope to the particular implementations described herein. For example, some implementations may be in hardware, such as employed to operate on a device or combination of devices, for example, whereas other implementations may be in software and/or firmware. Likewise, although claimed subject matter is not limited in scope in this respect, some implementations may include one or more articles, such as a signal bearing medium, a storage medium and/or storage media. This storage media, such as CD-ROMs, computer disks, flash memory, or the like, for example, may have instructions stored thereon, that, when executed by a computing device, such as a computing system, computing platform, or other system, for example, may result in execution of a processor in accordance with the claimed subject matter, such as one of the implementations previously described, for example. As one possibility, a computing device may include one or more processing units or processors, one or more input/output devices, such as a display, a keyboard and/or a mouse, and one or more memories, such as static random access memory, dynamic random access memory, flash memory, and/or a hard drive.

There is little distinction left between hardware and software implementations of aspects of systems; the use of hardware or software is generally (but not always, in that in certain contexts the choice between hardware and software can become significant) a design choice representing cost vs. efficiency tradeoffs. There are various vehicles by which processes and/or systems and/or other technologies described herein can be affected (e.g., hardware, software, and/or firmware), and that the preferred vehicle will vary with the context in which the processes and/or systems and/or other technologies are deployed. For example, if an implementer determines that speed and accuracy are paramount, the implementer may opt for a mainly hardware and/or firmware vehicle; if flexibility is paramount, the implementer may opt for a mainly software implementation; or, yet again alternatively, the implementer may opt for some combination of hardware, software, and/or firmware.

The foregoing detailed description has set forth various embodiments of the devices and/or processes via the use of block diagrams, flowcharts, and/or examples. Insofar as such block diagrams, flowcharts, and/or examples contain one or more functions and/or operations, it will be understood by those within the art that each function and/or operation within such block diagrams, flowcharts, or examples can be implemented, individually and/or collectively, by a wide range of hardware, software, firmware, or virtually any combination thereof. In one embodiment, several portions of the subject matter described herein may be implemented via Application Specific Integrated Circuits (ASICs), Field Programmable Gate Arrays (FPGAs), digital signal processors (DSPs), or other integrated formats. However, those skilled in the art will recognize that some aspects of the embodiments disclosed herein, in whole or in part, can be equivalently implemented in integrated circuits, as one or more computer programs running on one or more computers (e.g., as one or more programs running on one or more computer systems), as one or more programs running on one or more processors (e.g., as one or more programs running on one or more microprocessors), as firmware, or as virtually any combination thereof, and that designing the circuitry and/or writing the code for the software and or firmware would be well within the skill of one of skill in the art in light of this disclosure. In addition, those skilled in the art will appreciate that the mechanisms of the subject matter described herein are capable of being distributed as a program product in a variety of forms, and that an illustrative embodiment of the subject matter described herein applies regardless of the particular type of signal bearing medium used to actually carry out the distribution. Examples of a signal bearing medium include, but are not limited to, the following: a recordable type medium such as a flexible disk, a hard disk drive (HDD), a Compact Disc (CD), a Digital Versatile Disk (DVD), a digital tape, a computer memory, etc.; and a transmission type medium such as a digital and/or an analog communication medium (e.g., a fiber optic cable, a waveguide, a wired communications link, a wireless communication link, etc.).

Those skilled in the art will recognize that it is common within the art to describe devices and/or processes in the fashion set forth herein, and thereafter use engineering practices to integrate such described devices and/or processes into data processing systems. That is, at least a portion of the devices and/or processes described herein can be integrated into a data processing system via a reasonable amount of experimentation. Those having skill in the art will recognize that a typical data processing system generally includes one or more of a system unit housing, a video display device, a memory such as volatile and non-volatile memory, processors such as microprocessors and digital signal processors, computational entities such as operating systems, drivers, graphical user interfaces, and applications programs, one or more interaction devices, such as a touch pad or screen, and/or control systems including feedback loops and control motors (e.g., feedback for sensing position and/or velocity; control motors for moving and/or adjusting components and/or quantities). A typical data processing system may be implemented utilizing any suitable commercially available components, such as those typically found in data computing/communication and/or network computing/communication systems.

The herein described subject matter sometimes illustrates different components contained within, or connected with, different other components. It is to be understood that such depicted architectures are merely exemplary, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected", or "operably coupled", to each other to achieve the desired functionality, and any two components capable of being so associated can also be viewed as being "operably couplable", to each other to achieve the desired functionality. Specific examples of operably couplable include but are not limited to physically mateable and/or physically interacting components and/or wirelessly interactable and/or wirelessly interacting components and/or logically interacting and/or logically interactable components.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to subject matter containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

Reference in the specification to "an implementation," "one implementation," "some implementations," or "other implementations" may mean that a particular feature, structure, or characteristic described in connection with one or more implementations may be included in at least some implementations, but not necessarily in all implementations. The various appearances of "an implementation," "one implementation," or "some implementations" in the preceding description are not necessarily all referring to the same implementations.

While certain exemplary techniques have been described and shown herein using various methods and systems, it should be understood by those skilled in the art that various other modifications may be made, and equivalents may be substituted, without departing from claimed subject matter. Additionally, many modifications may be made to adapt a particular situation to the teachings of claimed subject matter without departing from the central concept described herein. Therefore, it is intended that claimed subject matter not be limited to the particular examples disclosed, but that such claimed subject matter also may include all implementations falling within the scope of the appended claims, and equivalents thereof.

What is claimed:

1. A method, comprising:
  receiving, by a network device comprising a processor, application software, wherein the network device is part of network devices of a network associated with a cloud computing environment;
  prior to installing the application software on the network device and to reduce network congestion between the network device and another network device of the network devices, analyzing, by the processor, a representation of the application software to identify an instruction for a synchronization event associated with the application software that triggers at least one of an input operation or an output operation to be implemented by the application software, wherein the at least one of the input operation or the output operation contributes to the network congestion after the installation of the application software on the network device;
  in response to the identification of the instruction for the synchronization event as being present in the representation of the application software, determining a probability of an occurrence of the network congestion;
  facilitating an execution of the application software after the installation of the application software on the network device based on a determination that the probability of the occurrence of the network congestion is less than a predetermined number; and
  providing, by the network device, a notification of the synchronization event to the installed application software at a delayed time interval from a time of the occurrence of the synchronization event.

2. The method of claim 1, further comprising:
  in response to a determination that the probability of the occurrence of the network congestion is more than the predetermined number, preventing, by the network device, the execution of the application software after the installation of the application software on the network device.

3. The method of claim 1, wherein the network devices of the network comprise at least one of a first network device that provides infrastructure as a service, a second network device that provides a platform as a service, or a third network device that provides software as a service.

4. The method of claim 1, wherein the probability is a first probability, and wherein the determination of the first probability of the occurrence of the network congestion comprises multiplying a second probability of an occurrence of the synchronization event by a number of applications determined to be deployed on the network devices of the network, and by a bandwidth consumption factor associated with the occurrence of the synchronization event.

5. The method of claim 1, wherein the analyzing comprises determining a presence of the instruction for the synchronization event based on a determination that a shared system event has occurred between at least two network devices of the network.

6. The method of claim 1, wherein the analyzing comprises determining a presence of the instruction for the synchronization event based on a determination that a shared system event affects at least two network devices of the network.

7. The method of claim 1, wherein the determining the probability of the occurrence of the network congestion comprises utilizing an application programming interface based instruction to collect information about the network devices.

8. The method of claim 1, wherein the probability is a first probability, and wherein the determination of the first probability of the occurrence of the network congestion occurring comprises determining a relationship between at least two of the network devices based, at least in part, on a second probability of an event occurrence, a number of event sharing nodes of the network, a third probability of network sharing by the number of event sharing nodes, a volume of input operations or output operations due to the event occurrence, and a bandwidth of the network device of the network devices.

9. A machine-readable non-transitory storage medium, comprising executable instructions that, when executed by one or more processors of a network device, facilitate performance of operations comprising:
receiving application software, wherein a network associated with a cloud computing environment comprises network devices including the network device;
prior to installing the application software on the network device, analyzing a representation of the application software to identify an instruction for a synchronization event associated with the application software that triggers an input operation or an output operation to be implemented by the application software, wherein the input operation or the output operation contributes to the network congestion after the installation of the application software on the network device;
determining a probability of an occurrence of the network congestion based, at least in part, on the identification of the synchronization event;
facilitating an execution of the application software on the network device in response to a determination that the probability of the occurrence of the network congestion is less than a predetermined number; and
providing, a notification of the synchronization event to the installed application software at a delayed time interval from a time of the occurrence of the synchronization event.

10. The machine-readable non-transitory storage medium of claim 9, wherein the operations further comprise:
in response to a determination that the probability of the occurrence of the network congestion is more than the predetermined number, preventing implementation of the application software after the installation of the application software on the network device.

11. The machine-readable non-transitory storage medium of claim 9, wherein the analyzing the representation of the application software comprises determining a shared time event affecting the network devices of the network.

12. A network device, comprising:
a processor; and
a memory that stores executable instructions that, when executed by the processor, facilitate performance of operations, comprising:
receive application software by the network device, wherein the network device is part of a group of network devices associated with a cloud computing environment;
prior to installation of the application software on the network device, analyze a representation of the application software to identify an instruction for a synchronization event associated with the application software that triggers an input operation or an output operation to be implemented by the application software, wherein the input operation or the output operation contributes to network congestion after the installation of the application software on the network device;
determine a probability of an occurrence of the network congestion based, at least in part, on identification of the instruction for the synchronization event;
enable, an implementation of the application software, after the installation of the application software on the network device based on a determination that the probability of the occurrence of the network congestion satisfies a rule related to a probability threshold; and
provide a notification of the synchronization event to the installed application software after a time interval from the occurrence of the synchronization event.

13. The network device of claim 12, wherein the operations further comprise:
in response to the probability of the occurrence of the network congestion being determined to satisfy the rule related to the probability threshold value, delaying the implementation of the application software after the installation of the application software on the network device.

14. The network device of claim 12, wherein the analyzing further comprises determining a shared time event affecting the network devices.

15. The method of claim 1, wherein the representation of the application software is a source code for the application software.

16. The method of claim 1, wherein the representation of the application software is a byte code for the application software.

17. The method of claim 1, wherein the representation of the application software is a binary code for the application software.

18. The machine-readable non-transitory storage medium of claim 9, wherein the representation of the application software is a source code for the application software.

19. The machine-readable non-transitory storage medium of claim 9, wherein the representation of the application software is a byte code for the application software.

20. The machine-readable non-transitory storage medium of claim 9, wherein the representation of the application software is a binary code for the application software.

21. The network device of claim 12, wherein the representation of the application software is a source code for the application software.

22. The network device of claim 12, wherein the representation of the application software is a byte code for the application software.

23. The network device of claim 12, wherein the representation of the application software is a binary code for the application software.

* * * * *